United States Patent
Bryant et al.

(10) Patent No.: US 8,032,324 B1
(45) Date of Patent: Oct. 4, 2011

(54) INTERACTIVE CONTROLLER DEVICE

(75) Inventors: Tyler M Bryant, Santa Rosa, CA (US); Andrew T. Taylor, Santa Rosa, CA (US); Davy J. Figaro, Sebastopol, CA (US)

(73) Assignee: PNI Corporation, Santa Rosa, CA (US)

( * ) Notice: Subject to any disclaimer, the term of this patent is extended or adjusted under 35 U.S.C. 154(b) by 176 days.

(21) Appl. No.: 12/194,427

(22) Filed: Aug. 19, 2008

Related U.S. Application Data

(60) Provisional application No. 60/956,907, filed on Aug. 20, 2007.

(51) Int. Cl.
G06F 17/16 (2006.01)
G06F 17/40 (2006.01)

(52) U.S. Cl. ........ 702/141; 702/150; 702/151; 702/196; 73/504.03

(58) Field of Classification Search .................. 702/141, 702/147, 150, 151, 196
See application file for complete search history.

(56) References Cited

U.S. PATENT DOCUMENTS

| | | | |
|---|---|---|---|
| 4,851,775 A | 7/1989 | Kim | |
| 5,239,264 A | 8/1993 | Hawks | |
| 5,381,603 A | 1/1995 | Lee | |
| 5,953,683 A * | 9/1999 | Hansen et al. | 702/95 |
| 6,020,956 A * | 2/2000 | Herman et al. | 356/139.01 |
| 6,162,191 A * | 12/2000 | Foxlin | 600/595 |
| 6,243,660 B1 | 6/2001 | Hsu | |
| 6,549,145 B2 | 4/2003 | Hsu | |
| 7,104,129 B2 | 9/2006 | Nasiri | |
| 7,158,118 B2 | 1/2007 | Liberty | |
| 7,216,055 B1 * | 5/2007 | Horton et al. | 702/153 |
| 7,236,156 B2 | 6/2007 | Liberty | |
| 7,239,301 B2 | 7/2007 | Liberty | |
| 7,250,112 B2 | 7/2007 | Nasiri | |
| 7,258,011 B2 | 8/2007 | Nasiri | |
| 7,262,760 B2 | 8/2007 | Liberty | |
| 7,451,549 B1 * | 11/2008 | Sodhi et al. | 33/356 |
| 7,529,640 B2 * | 5/2009 | Fujiwara | 702/151 |
| 2005/0174324 A1 | 8/2005 | Liberty | |
| 2006/0028446 A1 | 2/2006 | Liberty | |
| 2006/0130013 A1 | 6/2006 | Penzias | |
| 2006/0178212 A1 | 8/2006 | Penzias | |
| 2006/0250358 A1 | 11/2006 | Wroblewski | |
| 2006/0279549 A1 * | 12/2006 | Zhang et al. | 345/173 |
| 2007/0035518 A1 | 2/2007 | Francz | |
| 2007/0113207 A1 | 5/2007 | Gritton | |
| 2007/0124097 A1 | 5/2007 | Geck | |
| 2007/0176896 A1 | 8/2007 | Gritton | |
| 2007/0247425 A1 | 10/2007 | Liberty | |
| 2007/0252813 A1 | 11/2007 | Liberty | |
| 2007/0257885 A1 | 11/2007 | Liberty | |
| 2008/0158154 A1 | 7/2008 | Liberty | |
| 2009/0239586 A1 * | 9/2009 | Boeve et al. | 455/566 |

* cited by examiner

*Primary Examiner* — Hal Wachsman
(74) *Attorney, Agent, or Firm* — Fernandez & Associates, LLP

(57) ABSTRACT

A method and system for an interactive controller device comprising a two axis sensor in combination with one or more other sensors for hand-held devices operated in mid-air. A time sequence of measurements in three linearly independent directions is used to extract the angles of rotation around one or more distinct axes. A method is disclosed to approximately determine a transformation matrix, T, of a device orientation from a sequence of single vector measurements as a combination of rotations about specified axes. Calculated rotation angles can then be used to calculate changes in a controller or pointer position and a rate change thereof.

25 Claims, 10 Drawing Sheets

Figure 1:
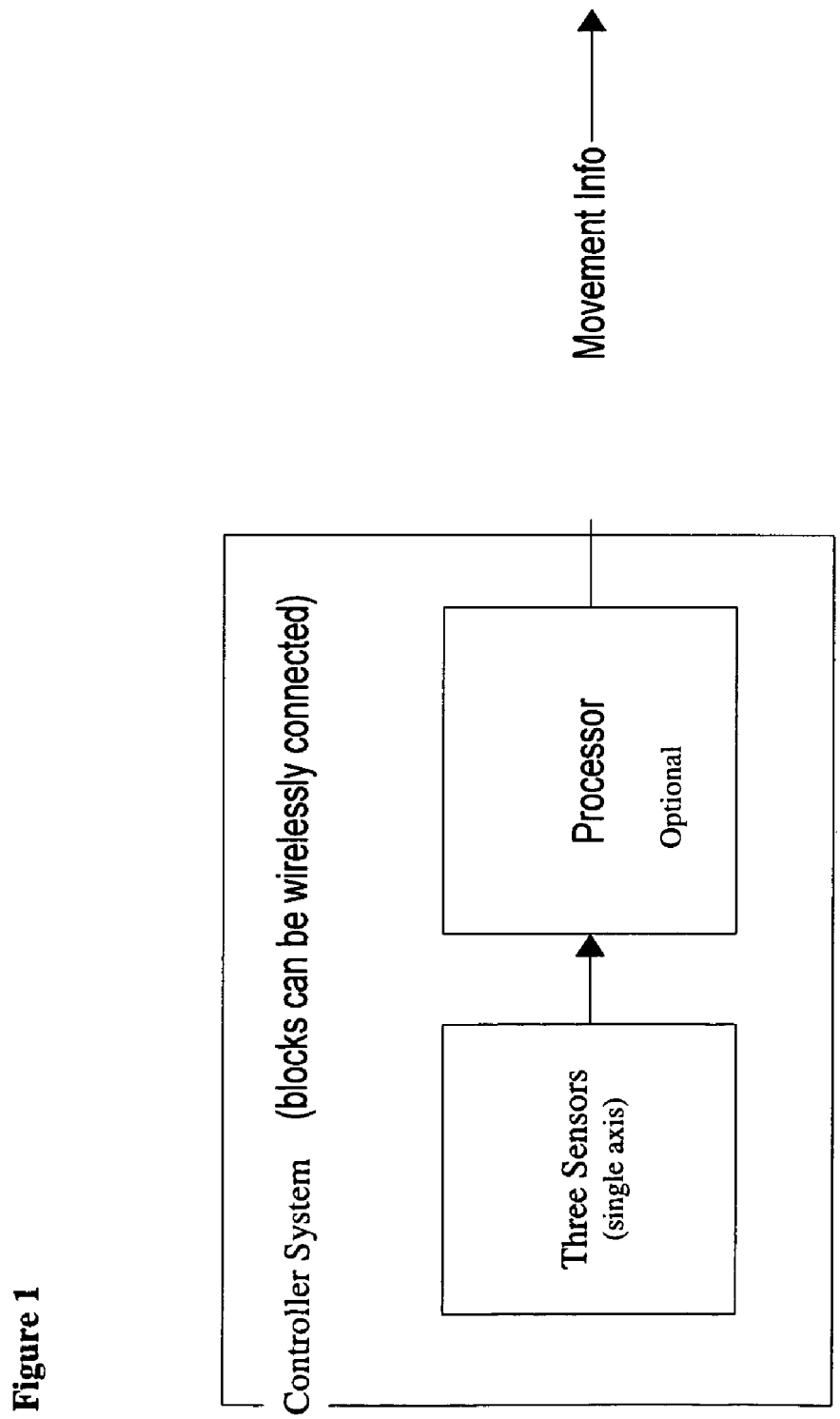

Dead zone around Be – rotation axis within dead zone causes errors

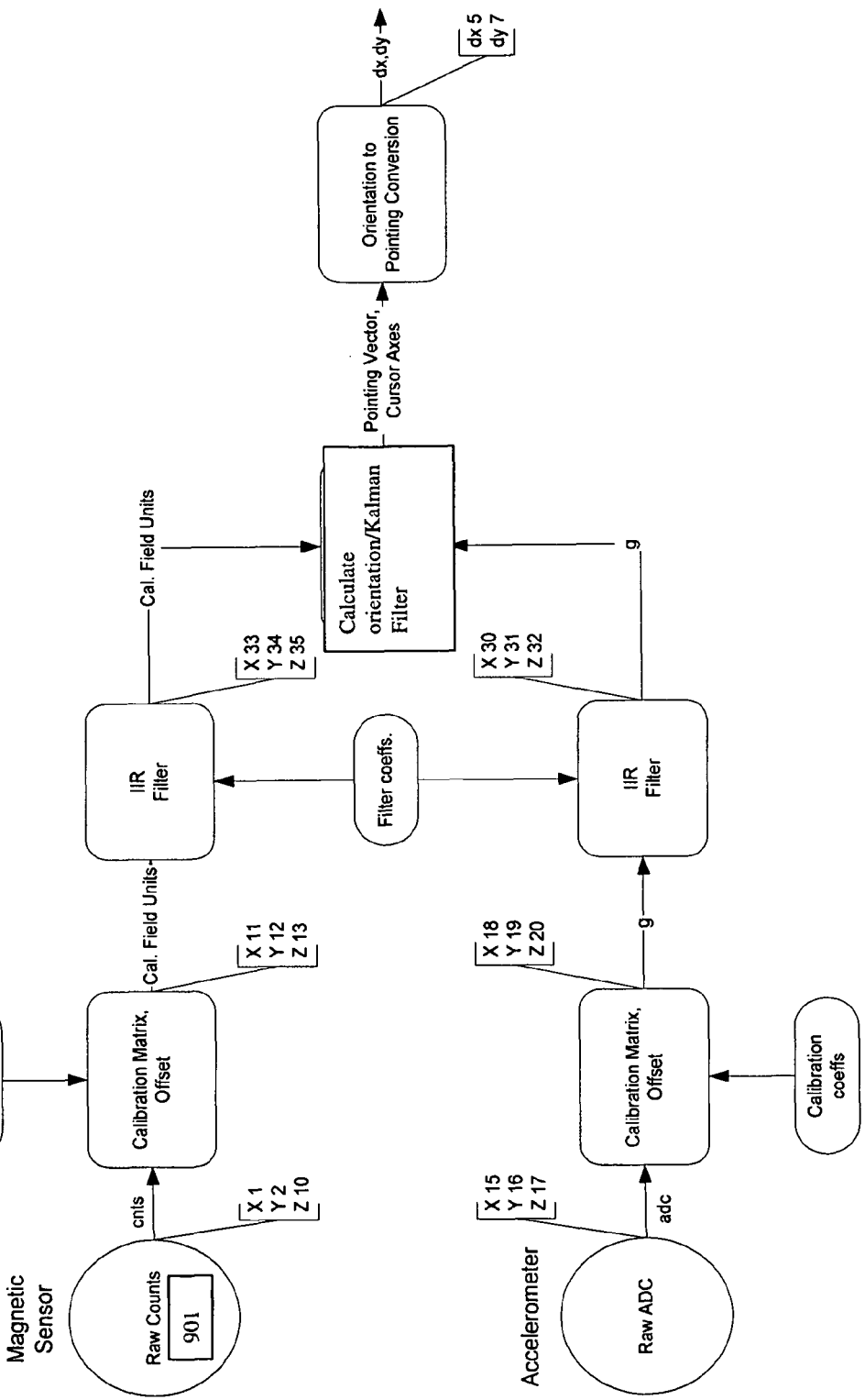
Figure 9    Overview of Controller data flow

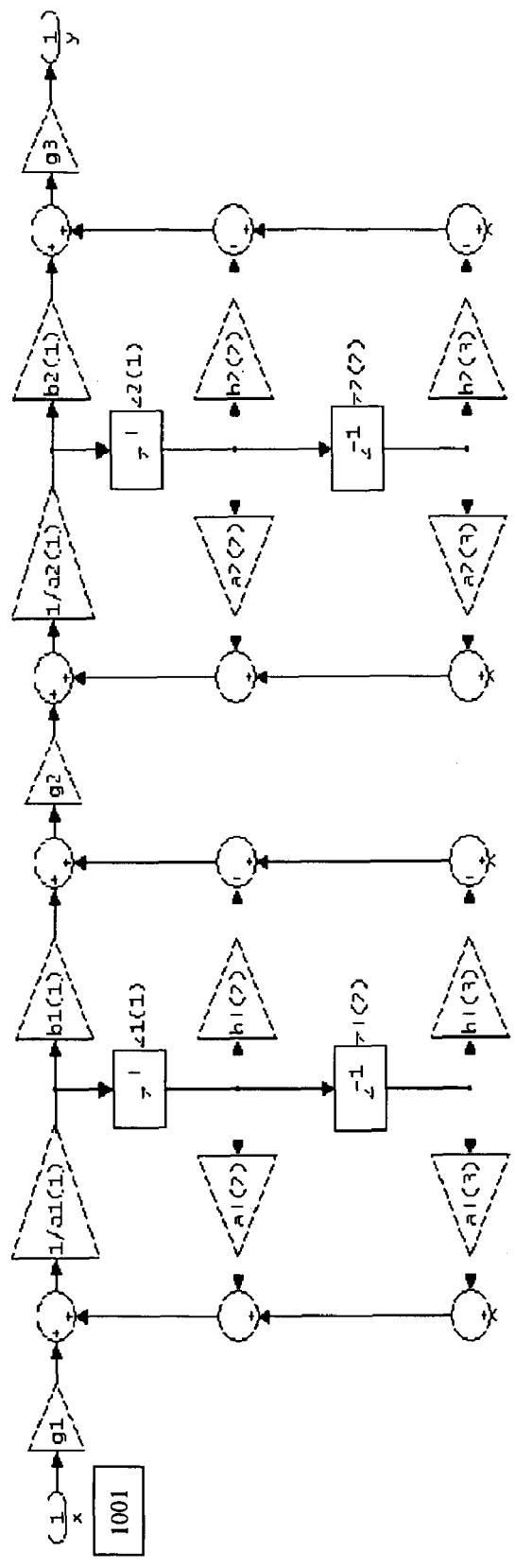
Figure 10    IIR Filter structure (from MATLAB documentation)

INTERACTIVE CONTROLLER DEVICE

PRIORITY

This application claims priority from Provisional Application 60/956,907 filed on Aug. 20, 2007.

CROSS-REFERENCE TO RELATED APPLICATIONS

The present invention is related to U.S. Pat. No. 4,851,775, U.S. Pat. No. 5,239,264, U.S. Pat. No. 5,381,603, U.S. Pat. No. 6,243,660, U.S. Pat. No. 6,549,145, pending U.S. application Ser. Nos. 11/502,593, 12/017,161, and 11/856,973, and pending application Ser. No. 12/251,338; titled, "Spherical Calibration and Reference Alignment Algorithms"; filed on Oct. 14, 2008 wherein additional explanatory information is presented. Disclosure from these patents and applications is included herein in their entirety by reference.

BACKGROUND OF THE INVENTION

1. Field of the Invention

The invention relates generally to user interface controllers and pointing devices, and particularly to a method and an apparatus to sense changes in a vector field (magnetic, acceleration, or other) to determine or estimate rotations about multiple axes.

2. Description of Related Art

User interfaces to technology are an integral part of almost all technological systems. Computer functionality has been revolutionized by advances in display technology and input devices such as the keyboard and computer mouse. The line between conventional computing devices and entertainment devices is being blurred as more features are being added that require computer processors, such as digital video recorders and digital television channel guides. New input devices that are suitable for use without a desktop surface will drastically improve the user experience. Gesture based game controllers will enable the gaming market to grow more quickly.

Low power magnetic sensor technology has been primarily developed for use in navigation instrumentation, where precise compass heading has been the goal. PNI is the owner of multiple patents protecting a low power, high accuracy, Magneto-Inductive technology that enables a magnetic sensor system that can be used to accurately measure the magnetic field, in three dimensions, present at the device. One of PNI Corporation's tilt-compensated compassing module products, the TCM2, includes a mode to output mouse control signals which is documented in the TCM2 manual.

U.S. Pat. No. 5,734,371 discloses a pointing device interactive with a video and/or computer system; the pointing device comprises an inclinometer for detecting the relative vertical position relative to an initial reference position and gimbaled azimuthal magnetic sensor generating a horizontal position indication signal.

Additional U.S. patents and applications relating to the instant invention are: U.S. Pat. No. 7,158,118, U.S. Pat. No. 7,236,156, U.S. Pat. No. 7,239,301, U.S. Pat. No. 7,262,760, U.S.20050174324, U.S.20060028446, U.S.20060130013, U.S.20060178212, U.S.20060250358, U.S.20070035518, U.S.20070113207, U.S.20070124097, U.S.20070124097, U.S.20070176896, U.S.20070247425, U.S.20070252813, U.S.20070257885, U.S.20080158154; all from Hillcrest Laboratories, Inc. Disclosures from the aforementioned patents and applications are included herein in their entirety by reference.

Hillcrest Laboratories has disclosed a series of methods which rely on a two dimensional rotation matrix to convert a first and second rotational output from a body frame into an inertial frame by calculating:

$$R=[\cos\theta \sin\theta -\sin\theta \cos\theta]\cdot[\alpha y \alpha z]$$

wherein $\theta$ is the tilt, $\alpha y$ is the first rotational output and $\alpha z$ is the second rotational output.

A method disclosed in the instant invention generates an output from sequenced measurements of instrument or device orientation, not from rotational outputs $\alpha y$ and $\alpha z$. As such, a two dimensional transformation, or an explicit determination of the instrument tilt is not performed. The Hillcrest method teaches a conversion from a body frame into an inertial frame; the method of the instant invention is directly measuring the inertial frame since the magnetic field is fixed in the inertial frame.

BRIEF SUMMARY OF THE INVENTION

The instant invention, in one embodiment, discloses the use of a multi-axis magnetic sensor, without an inclinometer, as a low-cost controller device for use with a game or other apparatus wherein knowledge of an orientation is desired; optionally, an orientation is sensed dynamically as it changes; optionally, sensed data is communicated or transmitted actively or passively as data is acquired; optionally data enabling computation of a rate of change of orientation of a controller device is acquired. In some embodiments a controller device comprises a multi-axis magnetic sensor and/or, optionally, a multi-axis accelerometer or inclinometer and/or, optionally, one or more angular rotation sensors and/or, optionally, one or more gyroscopes and/or, optionally, one or more other sensors. In some embodiments a controller device is interactive with other devices; other devices comprise display devices, computing devices, gaming devices and others needing input from a device comprising a magnetometer. In some embodiments a controller device functions as a pointing device; in some embodiments a controller device has a shape or form appropriate to the application; for instance when a controller device is attached to another object such as a golf club it may be configured to fit on the arm or the head of the golf club.

In some embodiments the instant invention utilizes magnetic sensor readings to determine angle and rate of rotation. The instant invention can be used in a pointing application, with or without other sensors such as inclinometers, including MEMS based accelerometers, gyros, angular rotation, and optical sensors; the instant invention can be used, for an example, in a golf club, tennis racket or bat to sense the swing, in a navigation device to measure angle of rotation, orientation and/or dynamic motion; optionally, the instant invention may include an algorithm for dynamic correction. In one embodiment a device, optionally a controller device, for sensing an orientation of the device, is attached to a second, larger device such that the orientation and acceleration of the second device is measured over a period of time wherein the device begins measuring when the second device's acceleration exceeds a predetermined magnitude; in one example orientation and acceleration of a golf club is measured repetitively; when the club is not swinging faster than some preset amount the device ignores the data or goes into sleep mode or other mode.

In one embodiment the invented controller or pointer device measures an ambient magnetic field along at least two axes and in fact determines a three dimensional vector B in a pointer device frame of reference. An arbitrary change of orientation of the pointer device may be written as a 3×3 transformation matrix, T. A subsequent magnetic field measurement of a new orientation, Bnew relates to B as $$Bnew = T*B \qquad (1)$$

A difficulty is that, given only B and Bnew, one is unable to uniquely determine T, since there are infinitely many matrices, A, that will satisfy $$Bnew = A*B \qquad (2)$$

Therefore a solution T cannot be uniquely determined. If, however, one had an additional independent vector measurement, for instance, G, then the solution would no longer be indeterminate, since $$Gnew = T*G \qquad (3)$$

$$Bnew = T*B \qquad (4)$$

along with a constraint $$T*\text{transpose}(T) = I \qquad (5)$$

results in a completely determined solution for T. This is the same reason that it is necessary to tilt compensate a compass, since measuring just the magnetic field alone leaves the angle of rotation around an ambient magnetic field vector undetermined.

BRIEF DESCRIPTION OF THE SEVERAL VIEWS OF THE DRAWING(S)

Figure 2:
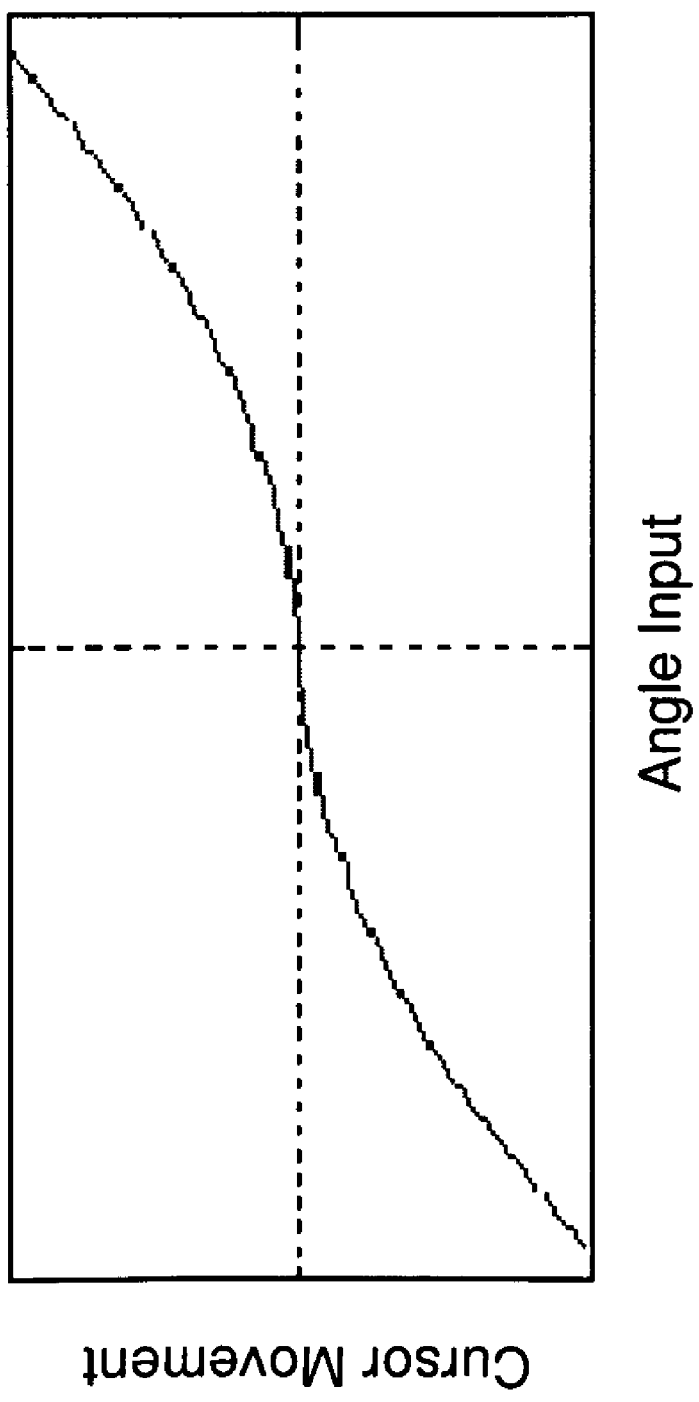
Figure 3:
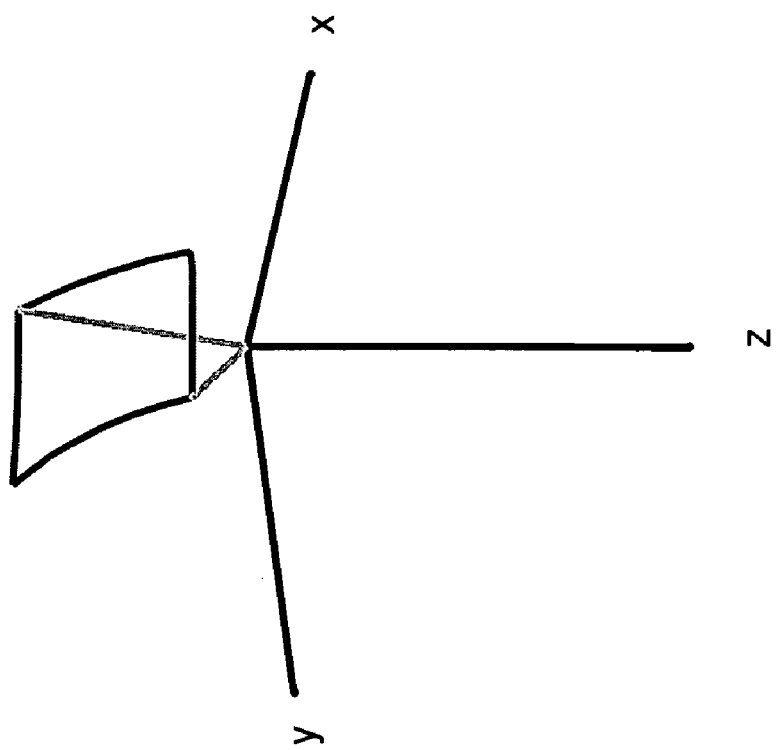
Figure 4:
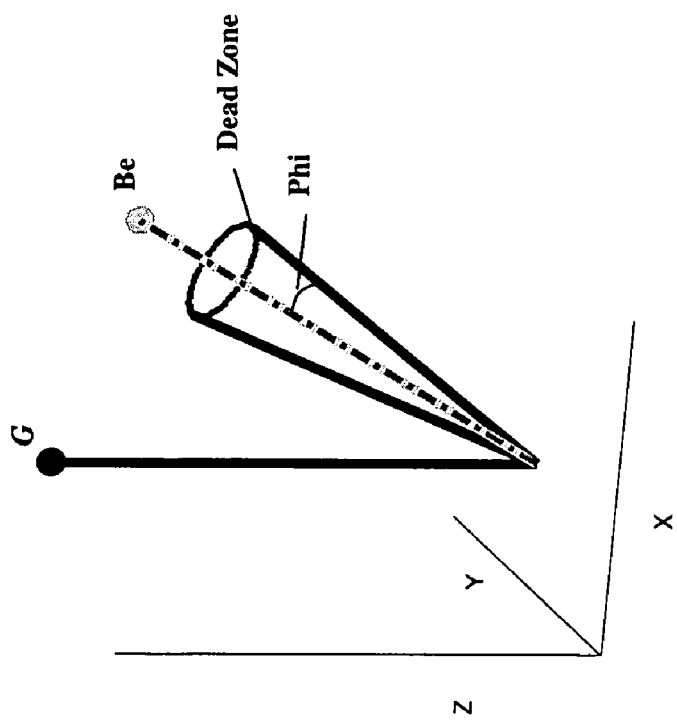
Figure 5:
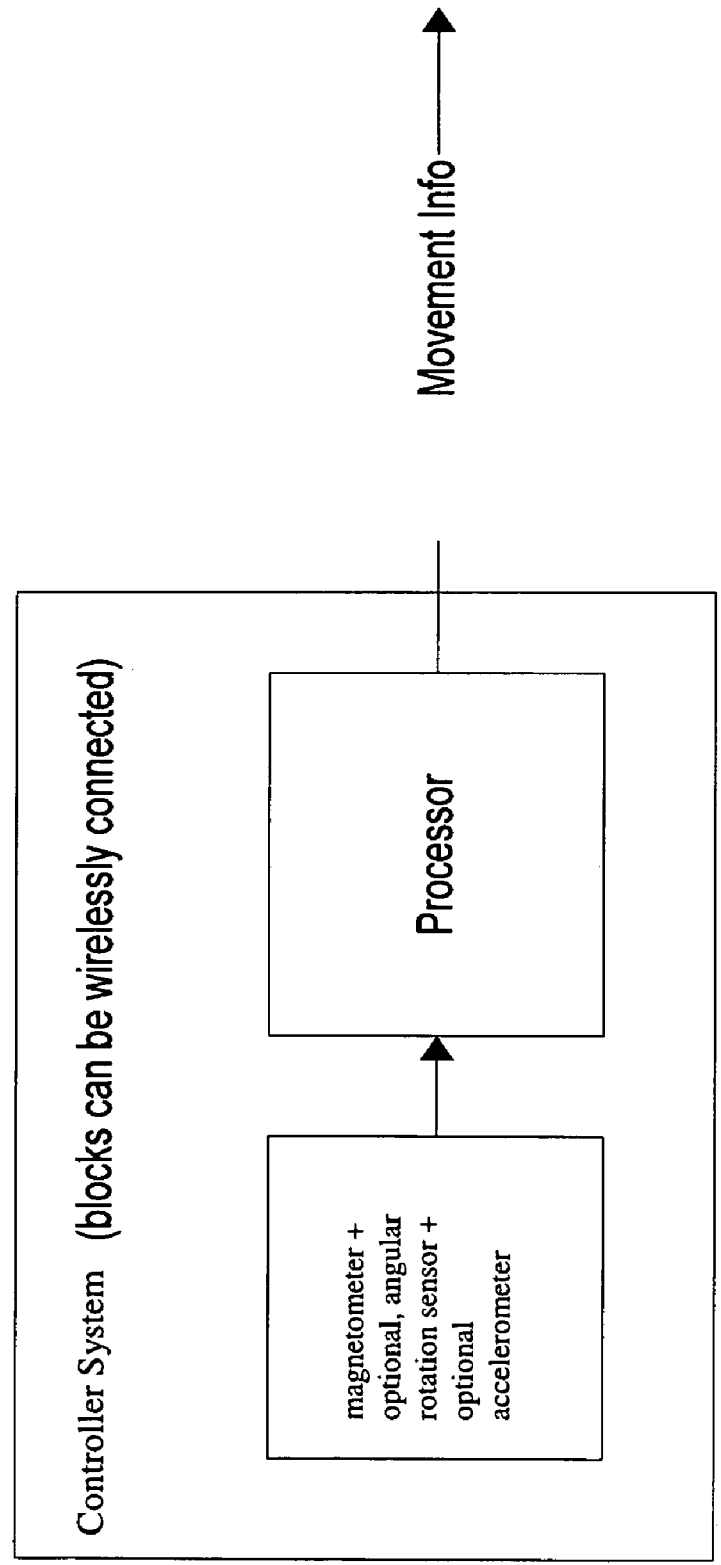
Figure 6:
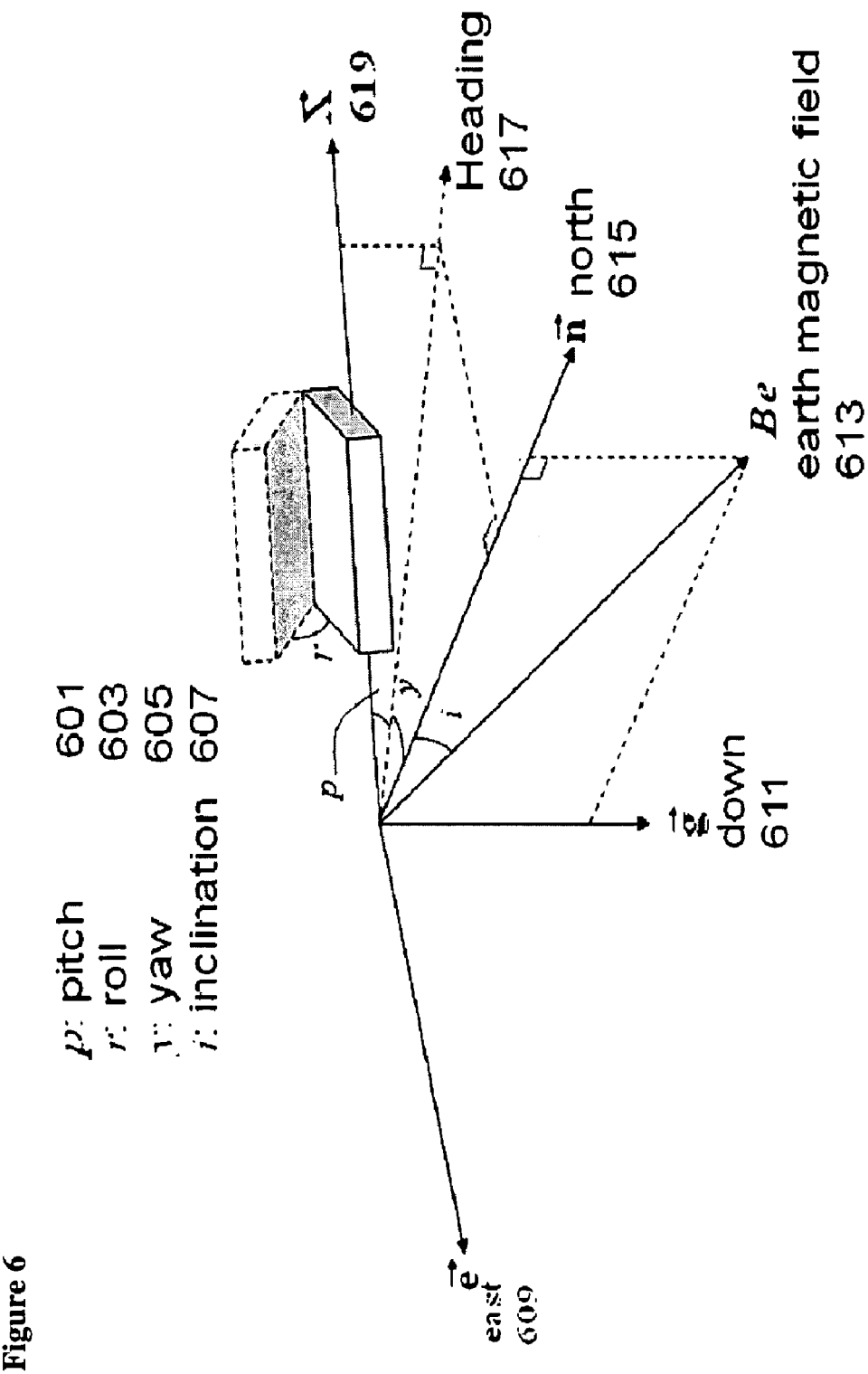
Figure 7:
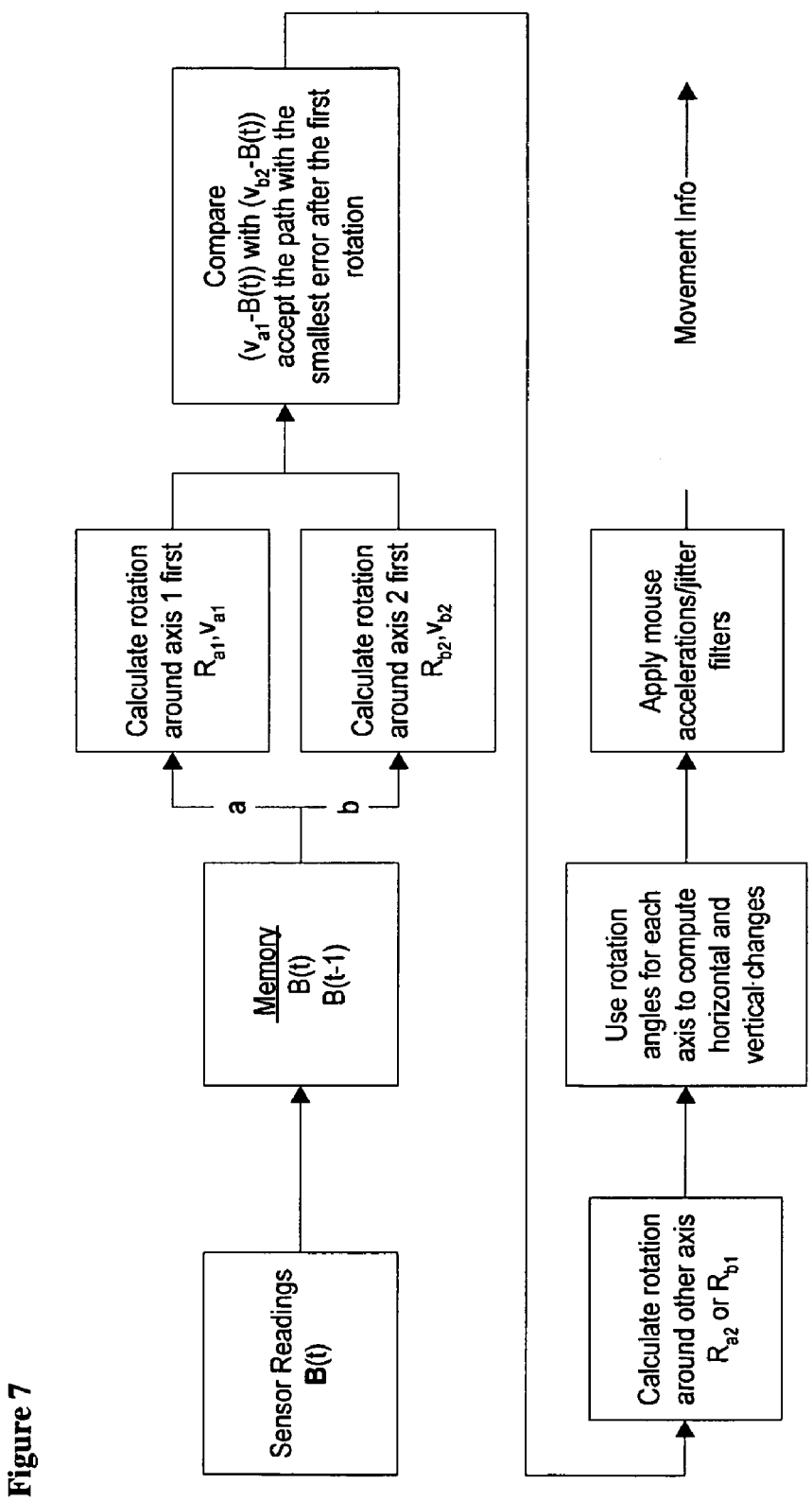
Figure 8:
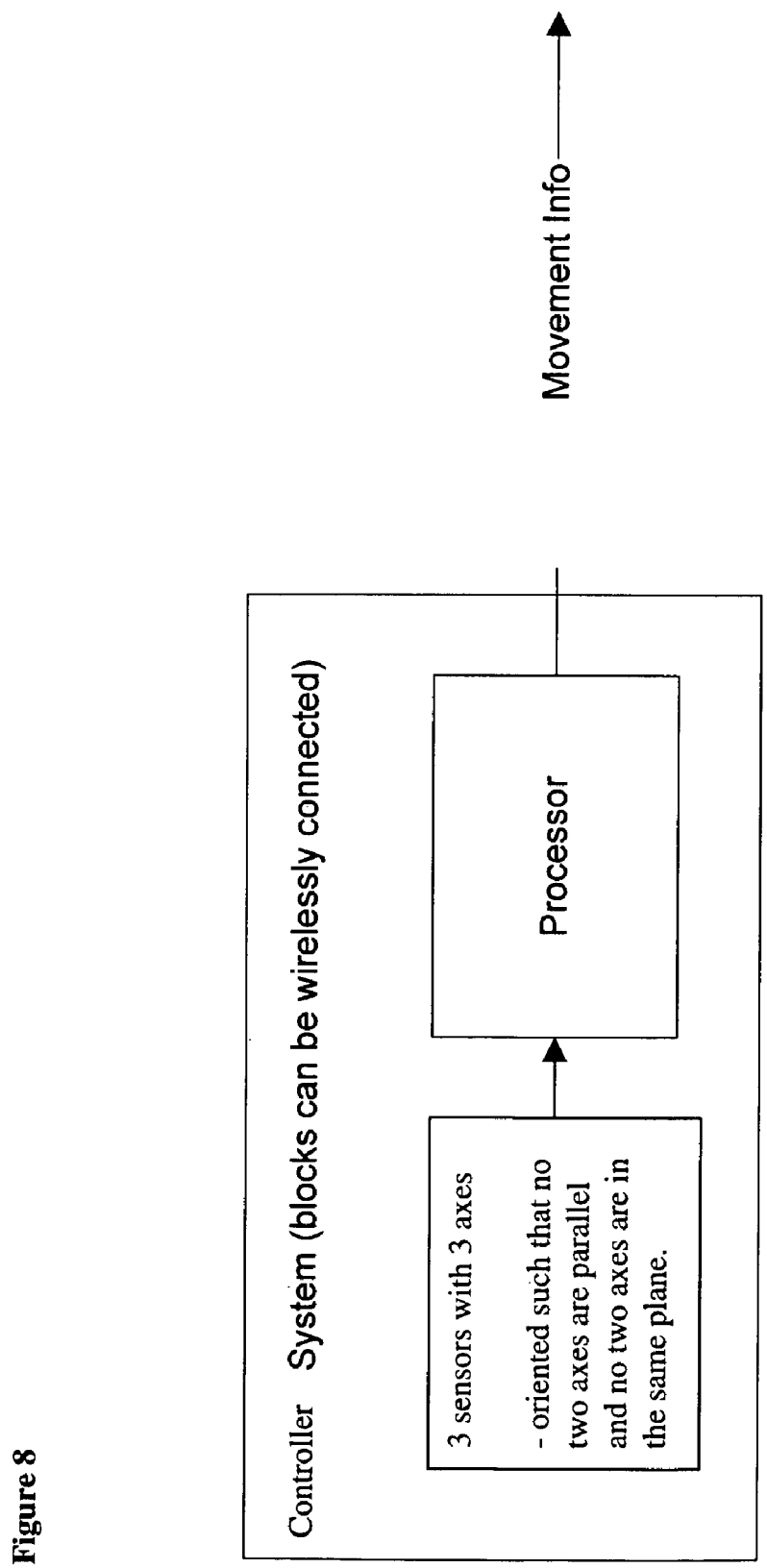

FIG. 1 Diagram of Components of one embodiment.
FIG. 2 Cursor movement versus angle with jitter smoothed.
FIG. 3 Controller paths on a sphere.
FIG. 4 Controller rotations with measurement near an axis or dead zone.
FIG. 5 Diagram of Components of one embodiment.
FIG. 6 Definition of orientation terms.
FIG. 7 Algorithm Flow of one embodiment.
FIG. 8 Diagram of Components of one embodiment.
FIG. 9 Overview of one embodiment of Controller data flow.
FIG. 10 IIR Filter structure.

SYMBOLS

Be Undistorted Earth's magnetic field vector
$\vec{g}$ Down vector in the earth coordinate system, pointed to the center of the earth.
$\vec{n}$ North direction vector of earth coordinate system, pointed in the direction of the magnetic North Pole in the local horizontal plane.
$\vec{e}$ East direction vector of earth's coordinate system, pointed in an easterly direction in the local horizontal plane.
i Inclination or dip angle
p Pitch angle
r Roll angle
y yaw angle or heading angle
X compass orientation of magnetic component in X direction
Y compass orientation of magnetic component in Y direction
Z compass orientation of magnetic component in Z direction
T 3×3 transformation matrix
T mag T with axial constraints
Tomega 3×3 transformation matrix from angular rate sensors

DETAILED DESCRIPTION OF THE INVENTION

The instant invention discloses a method and system for an interactive controller device comprising at least a two axis magnetic field sensor; optionally other sensors may be added based on application. A time sequence of measurements in at least two linearly independent directions is used to extract the angles of rotation around one or more distinct axes; optionally a time sequence of measurements is also used to calculate the rate of change of angles of rotation and calculate accelerations and other variables of interest. Although it is not possible to uniquely determine the transformation, T, of a device orientation from a sequence of single vector measurements alone, one can approximately determine T as a combination of rotations about specified axes. Rotation angles for each time step may be used to calculate changes in a controller or pointer position on a display device. Rotation angles and rate of change may be used to measure the swing of a golf club, tennis racket or other sports devices. Rotation angles and rate of change may be used to assist a car navigation system, determining the rate and angle of rotation of the car to provide navigation information as described in the literature.

In one embodiment three sensors are oriented so that no two are parallel and may not be in the same plane; in this embodiment, shown in FIG. 1, the sensors are linearly independent; one can take sensor readings or measurements and compute a vector in an orthogonal coordinate system. Repeating these measurements over time provides a time sequence of the field vector B(t)

$$B(t) = [Bx(t), By(t), Bz(t)] = \text{Align}*\text{Braw}(t) \qquad (6)$$

where Align is an alignment matrix determined from the orientation of the sensors, Braw(t) is the raw sensor output, and Bx(t), By(t), and Bz(t) are the components in an orthogonal coordinate system versus time.

Rotations around n≧1 (unit vector) axes U1, U2, ..., Un, written as matrices R1(a1), R2(a2), ..., Rn(an) can be used to approximate a transformation T. Ri(ai) is a rotation matrix for a rotation around axis Ui by angle ai. T is defined as an actual controller device transformation from a beginning or previous, (t−1) position to a next position, (t):

$$B(t) = T*B(t-1) \qquad (7)$$

The angles ai are the quantities of interest, as they will output from the device in one embodiment; optionally, only sensor data is output from the device and angles are computed by a separate device. The axes do not need to be fixed, and so U1, U2, ..., Un can be adjusted as necessary to avoid dead zone limitations, as discussed below. Optionally, one or more buttons may be used to select which axis is being used. In this way, one may press a button and turn a control or pointing device as a "control knob" to adjust a setting such as volume; in other embodiments button(s) facilitate to zoom-in and zoom-out on a specific object or search for objects in front or behind a traditional 2 dimensional screen. In some embodiments, icons and contents are displayed in 3-dimensional space, this type of operation can be used to easily search in 3-d space. Other actuators or sensors may be used in place of a button to manually or automatically select which axis to use. Other sensors can also be used to help reduce or eliminate dead zones. On a golf club or racket, an angular rotation sensor may be used to determine rate of rotation and swing acceleration or assist in calculating a more accurate acceleration. On a navigational device, rate of rotation may be used to determine acceleration, and more accurate position of the vehicle.

Angles ai may be further processed with a filter that reduces jitter and allows for increasingly large pointer or controller movements when a device is being moved more rapidly. An illustrative response is shown in FIG. 2 where user induced jitter has been smoothed.

One method to approximate T is to express T as a product of the R's using each rotation axis only once:

$$T = \Pi i (Rp\_i(ap\_i)) \qquad (8)$$

where p_i is one of the possible permutations of n. Each permutation can give different values for each of the angles numbers since rotation matrices do not commute, in general. For example, with 3 rotation axes, U1, U2 and U3, there are six possible permutations (123, 132, 231, 213, 312, 321). A particular permutation corresponds to a particular path along a sphere as illustrated in FIG. 3.

One must compute angles, and also choose a best sequence of these matrices. One way to compute a first angle for a given permutation p is as follows; suppose a first axis is j; to calculate angle aj around axis Uj requires one to bring a projection of the B(t−1) vector onto the plane normal to Uj, parallel to a projection of B(t) onto the same plane, as follows:

$$Pj(t) = \text{Projected}j(B(t)) = B(t) - (B(t)\text{dot}Uj)*Uj \qquad (9)$$

normalized to unity $$Pj\hat{}(t) = Pj(t)/|Pj(t)| \qquad (10)$$

and $$aj\_p = a\sin(Uj\text{dot}(Pj\hat{}(t)\text{cross}Pj\hat{}(t-1))) \qquad (11)$$

Since a rotation around axis Uj does not have to correspond to T, there will be a difference between the rotated B(t−1) and B(t).

$$\text{Err}\_p = Rj(aj\_p)*B(t-1) - B(t) \qquad (12)$$

Once all of the first angles have been calculated, the vector differences Err_p can be compared, the smallest of which is taken to be the best choice for a first axis. This will divide the remaining number of permutations by n, and the procedure can be repeated for subsequent axes, until a final axis is determined. The angles that have been computed for the chosen permutation are output, optionally, from a controller device for use in an external system such as a computer or television set top box, game console, optionally, with a pointer or icon or an object that moves in response to the movement of the controller device. Other sensor type inputs may be used to calculate Err_p; optionally an axis orientation may be determined from a continuous or intermittent sampling of a combination of sensor types, magnetic and not, as required for an application such as sport, gaming or navigation, in a two dimensional or three dimension format. FIG. 7 is an exemplary sequence of operations for embodiments of this type; FIG. 7 is also applicable to jitter filters for controllers and other hand held devices.

Dead Zone Limitations

It is important to note that there are certain orientations of a controller device when rotations around certain axes cannot be extracted. With ideal sensors, these will be orientations for which field measurements align precisely along axes of interest. In practice, however, using sensors with finite resolution and noise, these points will become regions, such that orientations that have a vector difference between a measured field and the axis that are on the order of the measurement uncertainty will fail to provide accurate rotation angles. FIG. 4 illustrates this situation.

In situations when a measurement aligns with one of the axes, since both the axis and the measurement are known, the device can have a special output indicating that a controller device is oriented in an unusable position. For example, a controller device would follow a trajectory that was predicted from the previous points until a user leaves a dead zone; alternatively, a controller device may change its appearance to indicate that it is in an unusable orientation. Optionally, a sensor, other than a magnetic sensor, in the system may be used to eliminate or reduce dead zones. Another sensor does not need to be sampled and used for this purpose at all times but may be used intermittently, as needed, to acquire additional information to assist as needed, for example, when in a dead zone; this may be a secondary use of another sensor which may have other primary functions in the system.

As with rotations with measurements near an axis, both the axes and the measurement are known, and so a controller or pointing device may indicate that it is oriented in a position that is likely to cause errors. A controller device may follow a predicted trajectory, or may change its appearance to indicate that it is in an unusable orientation.

In one embodiment an algorithm comprises the step of taking sensor readings B(t), storing at least one previous measurement B(t−1) in memory.

$$U1 = [0,0,1]; U2 = [0,1,0] \qquad (13)$$

with rotation matrices $$R1(a1) = \begin{bmatrix} \cos(a1) & -\sin(a1) & 0 \\ \sin(a1) & \cos(a1) & 0 \\ 0 & 0 & 1 \end{bmatrix} \qquad (14)$$

$$R2(a2) = \begin{bmatrix} \cos(a2) & 0 & \sin(a2) \\ 0 & 1 & 0 \\ -\sin(a2) & 0 & \cos(a2) \end{bmatrix} \qquad (15)$$

There are only two permutations A=12, B=21, so for A $$P1(t) = [Bx(t), By(t), 0] \qquad (16)$$

$$a1\_A = a\sin(Uj\text{dot}(P1\hat{}(t)\text{cross}P1\hat{}(t-1))) \qquad (17)$$

$$\text{Err}\_A = R1(a1\_A)*B(t-1) - B(t) \qquad (18)$$

In one embodiment, more than two measurements are used to determine angles by fitting a curve to a sequence of points so that points may be interpolated between measurements, leading to a more accurate choice of the path of a controller device. Similar interpolation techniques may be applied to alternative embodiments, such as tracking a turning car or swinging a sports device.

In one embodiment, a controller device and/or associated devices use rotation matrices multiple times by comparing errors after rotation by a fraction of the angles determined using the method described in an algorithm of another embodiment. This method increases the accuracy of the path chosen. Similar techniques may be applied to alternative embodiments, such as navigation or with sports devices.

In one embodiment, a controller device senses a gravitational field vector with one or more axis accelerometer or inclinometer and/or angular rate sensor and/or with one or more gyroscopes; data is processed to extract angles of the rotations around a z axis (device down) and a y axis (device right) between subsequent time steps. A means for processing, such as a processor, then communicates, optionally, wirelessly, to a set top box and/or computer and/or a game console connected to a display, which has a pointer or cursor or icon or object that moves based upon information received from the controller device. Device and other frames of reference may be determined with different combinations of sensors chosen from a group comprising one or more axis accelerometer, inclinometer, angular rate sensor, gyroscope, magnetic, optical, and tactile. FIG. 6 provides definition of various orientation terms.

In some embodiments MEMS sensors from InvenSense Inc. of Santa Clara, Calif. for acceleration and/or angular rate of rotation sensing are used in conjunction with magnetic sensors from PNI Corp. of Santa Rosa, Calif. for heading and orientation sensing. InvenSense sensors are described in U.S. Pat. No. 7,258,011, U.S. Pat. No. 7,250,112, U.S. Pat. No. 7,104,129 and others assigned to InvenSense, all included herein in their entirety by reference.

In one embodiment, a car "black-box" device senses a gravitational and/or a magnetic field vector with a combination of sensors; the data is processed to extract angles of rotation around x, y and/or z axis; information may be stored or transmitted to provide a history of activity, such as motion, of a vehicle; the information is available for analysis such as after an accident or tracking activity of a teenager. In one embodiment, a controller device senses an ambient magnetic field vector with at least two or three axis magnetic sensors, aligned orthogonally, or not, and/or with no two sensors parallel, and senses an angular rate with one or more other sensors; FIG. 5 shows one example of this embodiment. This embodiment involves taking sensor readings B(t), and omega_i(t), where omega_i is the angular rate or delta angle measured at time t by the $i^{th}$ angular rate sensor. The previous measurement B(t−1) is stored in memory; optionally, multiple previous measurements can be stored to allow for signal processing, such as smoothing, to occur prior to performing remaining steps in an algorithm. In an alternative embodiment, shown schematically in FIG. 8, a system for sensing the orientation of a first device sequenced in time comprises a first device comprising first, second and third sensors comprising first, second and third axis wherein the first, second and third sensors are oriented such that no two axes are parallel and no three axes are in the same plane; and wherein angular rate of rotation of the device is continuously sensed and a magnetic field around an axis orthogonal to the angular rotation axes is continuously sensed. Optionally, a system further comprises a means for computing and algorithm comprising an Extended Kalman Filter such that Tomega, T=R(a), B(t)=R(a)*Tomega*B(t−1) and attitude are computed in timed sequence.

Omega_i is the angular rate from the $i^{th}$ angular rate sensor, Uomega_i is the axis of the $i^{th}$ angular rate sensor, and Tomega is the transformation that is obtained by combining all of the angular rate sensor rotations.

Since the rotation around the axes of the angular rate sensors are known, a transformation matrix Tg can be decomposed into two pieces, one measured directly with, for instance, angular rate sensors, Tomega, and the remainder, to be determined using magnetometers, T.

$$Tg=T*Tomega \quad (19)$$

In some embodiments of the instant invention, Tmag, which is calculated as T but is constrained to be a rotation around axes which are orthogonal to angular rate axis, Uomega_i. In this way, if one angular rate sensor is used, there are two undetermined rotation angles, and these may be determined by a magnetometer. If two angular rate sensors with axes that are not collinear are used, then there is only one rotation axis orthogonal to both, and Tg can be solved for uniquely. If three or more angular rate sensors are used, the redundant information can be used to compensate for measurement errors.

In an embodiment with two angular rate sensors, the angular rate sensors may be oriented such that they have axes which correspond to the device down, and device right.

$$Uomega1=[0,0,1]; Uomega2=[0,1,0] \quad (20)$$

Then Tmag would consist of a rotation around an axis orthogonal to both angular rate axes, which is considered to be "device forward".

$$Umag=Cross(Uomega1,Uomega2)=[1,0,0] \quad (21)$$

[1 0 0]

$$Tmag = R(a) = \begin{bmatrix} 0 & \cos(a) & -\sin(a) \\ 0 & \sin(a) & \cos(a) \end{bmatrix} \quad (22)$$

In this case there is only one angle to be determined. It can be found as the rotation around Umag that brings the previous magnetic field vector, rotated by Tomega, into the current magnetic field vector.

$$B(t)=R(a)*Tomega*B(t-1) \quad (23)$$

This provides a system of equations which can be inverted to obtain the angle a. In an embodiment with one angular rate sensor, the techniques presented earlier can be used to obtain the angles around two axes, both orthogonal to the angular rate sensor.

In one embodiment, an optimal filter such as an Extended Kalman Filter may be implemented to perform absolute attitude estimation: an example is found in Grewal, M. S.; Andrews, A. P.; "Kalman Filtering Theory and Practice using Matlab"; John Wiley and Sons; New York, 2001. The matrix T approximated by any of the previous techniques can be used to propagate the state variable for the attitude. The state can be augmented beyond attitude to include variables such as angular rate sensor bias, scale factors, magnetometer correction terms, non-gravity acceleration vectors, and accelerometer correction terms. Having angular rate sensor bias in the state can be an important method to avoid frequent re-calibration. Optionally, an augmented state vector may be updated during calibration periods. Sensor measurements, including those for Kalman Filter measurements comprise one or more of magnetometer measurements, accelerometer measurements, angular rate, gyroscopic, optical, infrared, or other means of estimating orientation, heading, location, attitude and gestures and interpretations of human gestures.

In embodiments where attitude is known absolutely in a magnetic, inertial frame, which is referred to as an Earth frame, such as through standard compassing techniques or as the output of a Kalman filter, the orientation may be represented as a direction cosine matrix. Many standard attitude determination techniques, for example a Triad algorithm, and forms of the output are possible, for example quaternions, yaw-pitch-roll, etc.

In an exemplary coordinate system, Down_df, East_df, and North_df are the three component vectors describing Down, East, and North in the device frame of reference. Note, alternative coordinate systems produce equivalent results. The X-axis of the device, defined to be the forward direction, or the direction in which the controller device is pointing, is then given in the Earth Frame of coordinates as:

$$\text{Tip\_}ef=[\text{North\_}df(1)\text{East\_}df(1)\text{Down\_}df(1)] \quad (24)$$

Where Vector_df(1) denotes the 1st, or X axis, of North_df, and Tip_ef is then a three component vector. A sequence of Tip vectors are used to take a numerical derivative. There are many possible ways to perform the derivative, including smoothing filters, such as a Savitzgy-Golay, or as an IIR with a transfer function obtained from inverting the transfer function of an integrator. In one embodiment a derivative of the change in orientation is calculated over at least one time increment. As used herein "Tip" refers to a device's pointing direction in the Earth frame; note that a device need not have a "point" to be used as a pointer; a controller or object may have a certain orientation, designated by the manufacturer, associated with a pointing direction.

An exemplary numerical derivative method is to obtain the derivative directly from a difference of the two most recent points:

$$d\text{Tip\_}ef=\text{Tip\_}ef-\text{Tip\_}ef\_\text{prev} \quad (25)$$

Where Tip_ef_prev is the stored value from the previous measurement.

The Rotation axes desired to be used for cursor movement, U1 and U2, may change based on the orientation of the device. As a specific example, if the device is pointed vertically, it no longer makes sense to use the up/down rotation axes for the horizontal cursor movement. To handle this situation we switch between two different modes, "Earth Frame" and "Device Frame", in the Earth Frame mode, U1 and U2 are based on vectors in the earth frame, as follows:

$$U1=\text{Down\_}ef \quad (26)$$

$$U2=\text{Cross}([001],\text{Tip\_}ef) \quad (27)$$

Using these rotation axes, a pair of displacement vectors from the Tip are calculated, corresponding to the direction in which the tip would move if rotated around the axes.

$$A1=\text{Cross}(u1,\text{Tip\_}ef) \quad (28)$$

$$A2=\text{Cross}(u2,\text{Tip\_}ef) \quad (29)$$

In the "Device Frame" mode, when the rotation axes are based on the device, there is no need to calculate u1, and u2, since the displacement vectors can be taken directly from the orientation matrix as follows:

$$A1=[\text{North\_}df(2)\text{East\_}df(2)\text{Down\_}df(2)] \quad (30)$$

$$A2=[\text{North\_}df(3)\text{East\_}df(3)\text{Down\_}df(3)] \quad (31)$$

Once these displacement vectors have been calculated, unscaled cursor translations, dx and dy are calculated as a projection of the derivative vector along these displacement vectors as follows:

$$dx\_\text{unscaled}=\text{dot}(d\text{Tip\_}ef,A1) \quad (32)$$

$$dy\_\text{unscaled}=\text{dot}(d\text{Tip\_}ef,A2) \quad (33)$$

The values dx_unscaled and dy_unscaled could alternatively be computed as the inversion of a system of equations involving rotation matrices around the axes U1, and U2. A matrix inversion method produces more accurate estimation of the angles, particularly when the angles are large, but will require more computation. This method is a linear approximation to that solution, and one knowledgeable in the art could construct a second or higher order approximation.

Optionally, a threshold for a minimum output is performed as follows, if the quantity (dx_unscaled^2+dy_unscaled^2) is less than a specified value, Point_threshold, then the output will be set to zero.

Optionally, an overall scaling, Point_gain is applied, in order to convert the values into appropriate mousing units:

$$dx\_\text{final}=\text{Point\_gain}*dx\_\text{unscaled} \quad (34)$$

$$dy\_\text{final}=\text{Point\_gain}*dy\_\text{unscaled} \quad (35)$$

dx_final and dy_final provide the inputs for movement of a cursor or icon on a display screen for a game or other activity wherein a controller device provides a suitable input device. With this method, in some embodiments, a time sequence of 3D orientations of a controller device is translated into 2D cursor outputs, effectively translating 3D motion into 2D cursor or icon motion. In other embodiments conversion of time sequenced 3D orientations into motion of a figure in a virtual 3D environment or into recognition of various gestures is enabled. In other embodiments time sequenced 3D orientation information is combined with 3D acceleration information to enable six degree of freedom control.

In one embodiment of an orientation controller, shown in FIG. 9, a calibration matrix and offset algorithm are shown. Block, 901, takes raw counts from a magnetic sensor and/or another sensor, and applies a calibration matrix and offset stored in memory, optionally, non-volatile memory. Calibration coefficients for both the magnetometer and the accelerometer consist of a 3×3 alignment matrix, MagMatrix(3,3) or AccelMatrix(3,3), and a 3 element offset MagOffset(3), AccelOffset(3).

The output of the calibration block for the Mags, MagCal, is given by the following equation:

$$\text{MagCal}=\text{MagMatrix}*(\text{MagRaw}-\text{MagOffset}) \quad (36)$$

And similarly, for the accelerometers:

$$\text{AccelCal}=\text{MagMatrix}*(\text{AccelRaw}-\text{AccelOffset}) \quad (37)$$

The outputs are scaled to Calibration Field units for the magnetometer, and g for the accelerometer.

One exemplary IIR Filter, a Direct Form II, Second-Order Section, with a structure as in FIG. 11; FIG. 10 is derived from MATLAB documentation. The filter block, 1001, takes incoming data and applies an IIR filter to the data. The filter coefficients are stored in non-volatile memory, optionally. Biquad coefficients are stored as two rows of 6 elements each for the two individual sections, plus 3 other values for the scaling. Each row for the sections is arranged as [b0 b1 b2 a0 a1 a2], with the scaling as [g1, g2, g3]. The outputs are filtered values; optionally, overall filter gain is set to one, 1.0.

In some embodiments a conversion from Orientation to Pointing is made using a "conversion algorithm". This block takes a 3×3 orientation matrix of a pointer or controller or object and computes pointer or controller or object coordinates. First absolute orientation, through standard techniques, is calculated. The following sequence gives a direction cosine matrix for orientation; other attitude determination techniques, Triad algorithm for example, and forms of the output are possible, including quaternions, yaw-pitch-roll, and others known to one knowledgeable in the art.

$$\text{Down\_}df=\text{AccelCal}/\text{magnitude}(\text{AccelCal}) \quad (38)$$

$$\text{East\_}df=\text{Cross}(\text{Down},\text{MagCal})/\text{magnitude}(\text{MagCal}) \quad (39)$$

$$\text{North\_}df=\text{Cross}(\text{East},\text{Down}) \quad (40)$$

Where Down_df, East_df, and North_df are the three component vectors describing Down, East, and North in the device frame of reference, as stated previously.

In one embodiment, a device, optionally a controller or pointing device, senses one or more gravitational field vectors and one or more magnetic field vectors with one or more gravity or rotation sensors and one or more magnetometers; sensing may be continuous or intermittent; data sensed may be processed in a controller device or transmitted elsewhere for processing; sensed data may be passively communicated to an external device such as used in a RFID tag and sensor. Magnetic and/or gravitational orientation data may be sensed at a rate sufficient to calculate a rate of change of orientation of a controller device; this data may be used to calculate how fast a controller device is moving and how much energy is applied to a controller device. A controller device may be affixed to another device such as a tennis racket or golf club or other sport or recreational device or user to measure and track its or his trajectory and speed. Sensed orientation data are, optionally, processed by a controller device to extract angles of rotations around one or more axes between subsequent time steps. Optionally, a controller device communicates in some fashion to another device, such as a set top box or computer, optionally connected to a display; a computer or other device initiates additional steps based on information received from a controller device; example additional steps may range from simply storing received data to performing complex operations in a game or other program. Gravitational and/or magnetic sensors may be orthogonally aligned or not; in general, no two sensors are parallel. Combinations of magnetic sensors from two to more than three, in combination with none or one or more other sensors are disclosed based on the orientation sensitivity and cost constraint of a particular application. Alternatively, combinations from two to more than three inertial sensors, in combination with none or one or more magnetic sensors are disclosed based on the orientation sensitivity and cost constraint of a particular application.

A controller device may communicate to a user or other device through one or more means chosen from a group comprising wireless, WiFi, radio frequency, RF, electrically, auditory, optically, tactilely, and visually. A controller device may be powered through one or more means chosen from a group comprising battery, energy scavenger, energy cell, RF, microwave, and electrical.

In one embodiment, a controller or pointing device comprises a 3-axis sensor; and a processor that extracts the rotations around at least one axis so that changes in the sensor readings correspond to changes in the device position. A means for processing and/or computing comprises processors suitable for a handheld device with regard to size, power consumption and computing capability; many are known to one knowledgeable in the art.

Optionally, a controller device further comprises a display device for displaying a visual representation of the pointer position or other schematic information of interest.

Optionally, a controller device further comprises at least a two-axis magnetometer sensor that senses an ambient field at the device; such field may be Earth's magnetic field or a field from local magnetic sources, such as a permanent magnet or a Helmholtz coil or some combination of magnetic fields. Means for measuring a magnetic field comprises one or more sensors selected from a group comprising magnetoinductive, magnetoresistive, squid, anisotropic magnetoresistive, fluxgate, magnetotransistor, giant magnetoresistive, spin valves and others known to one knowledgeable in the art.

Optionally, a controller device may determine gestures such as the twist of the wrist, a tap of a baton, or a circle in the air. Optionally, a controller device may determine hand writing from the device movements. Optionally, a controller device may use a roll motion as zoom for a browser, roll motion as a rotation of a cursor, roll motion to trigger any action by a computer or gaming system Optionally, a controller device comprises at least a two-axis magnetometer and, optionally, one or more other sensors chosen from a group comprising accelerometer, inclinometer, gyroscope, rotation, GPS, optical, tactile and others known to one knowledgeable in the art, such that a controller device is enabled to sense its position, orientation, heading, and/or rate of change of these parameters; optionally, a controller device communicates at least raw sensor readings to another device, such as a computer or game or other system comprising a display; the at least raw sensor readings, optionally, additionally processed, enable a variety of activities, such as displaying a cursor whose motion and location depend on input from the controller device.

Optionally, a controller device that comprises a multi-axis magnetometer and an IR sensor along with an IR source mounted near the computer/game/television system that provides pointer or cursor position information to a screen Optionally, a controller device further comprises buttons that determine axes of interest; such as a button that sets "rotation axis forward" so that a controller device may be twisted like a knob and orientation signals are communicated so as to adjust a computer/game/television system parameter such as a volume control, for instance; other parameters are possible. In one embodiment a controller device comprises one or more buttons such that engagement of a button enables predetermined orientation data to be transmitted in order to activate a predetermined parameter in a remote system.

The foregoing described embodiments of the invention are provided as illustrations and descriptions. They are not intended to limit the invention to a precise form as described. In particular, it is contemplated that functional implementation of invention described herein may be implemented equivalently in hardware or various combinations of hardware and software and/or other available functional components or building blocks. Other variations and embodiments are possible in light of above teachings to one knowledgeable in the art, and it is thus intended that the scope of invention not be limited by this Detailed Description, but rather by Claims following.

We claim:

1. A method for a device to estimate orientation comprising the steps;
   moving the device through a changing orientation in a sequence of time from an initial orientation to a final orientation;
   measuring a magnetic field in at least two axes of the device in timed sequence; and
   computing a transformation matrix, T, at each timed sequence as a product of rotations about the at least two axes of the device such that $T = \Pi\_i\,(Rp\_i(ap\_i))$ wherein T is approximately determined as a combination of rotations about the at least two axes of the device such that the final orientation is estimated as the initial orientation of the device times the product of rotations, T, from the initial orientation to the final orientation and $Rp\_i(ap\_i)$ is a rotation matrix for a rotation around axis Ui by angle ai wherein the device is operable to do the estimating, measuring and computing based upon the changing orientation of the device in timed sequence in the magnetic field.

2. The method of claim 1, further comprising the step of:
computing a state variable, attitude, of said device with an algorithm comprising a Kalman Filter and a timed sequence of T wherein the matrix T propagates the state variable attitude.

3. The method of claim 2, further comprising the steps of:
estimating the device orientation at a first time and a second time.

4. The method of claim 1, further comprising the step of:
measuring acceleration of said device in at least two axes of the device in timed sequence.

5. The method of claim 4, further comprising the step of:
computing a state variable, attitude, of said device with an algorithm comprising a Kalman Filter and a timed sequence of T wherein the matrix T propagates the state variable attitude.

6. The method of claim 5, further comprising the step of:
computing said device orientation and acceleration in time.

7. The method of claim 1, further comprising the steps of:
measuring angular rates of rotation of the device; and
computing Tg=T*Tomega, wherein Tomega is the transformation that is obtained by combining at least two of the angular rates of rotations.

8. The method of claim 7, further comprising the step of:
computing a state variable, attitude, of said device with an algorithm comprising a Kalman Filter and a timed sequence of T wherein the matrix T propagates the state variable attitude.

9. The method of claim 8, further comprising the steps of:
estimating the device orientation at a first time and a second time.

10. The method of claim 7, further comprising the step of:
measuring acceleration of said device in at least two axes of the device in timed sequence.

11. The method of claim 10, further comprising the step of:
computing a state variable, attitude, of said device with an algorithm comprising a Kalman Filter and a timed sequence of T wherein the matrix T propagates the state variable attitude.

12. The method of claim 11, further comprising the step of:
computing said device orientation and acceleration in time.

13. A method for converting a time sequence of 3D orientation data of a controller device in a magnetic field into data for moving an object on a display screen in a first and second dimension comprising the steps;
estimating the orientation of the controller device such that the orientation is estimated as the initial orientation of the controller device times the product of rotations, T, from the initial orientation to the final orientation;
calculating a derivative in time of the controller device orientation in Earth frame, Tip_ef, as dTip_ef, over at least one time increment;
calculating controller device displacement vectors A1, in a first dimension, and A2, in a second dimension;
calculating a controller device translation in a first dimension as:
dx_unscaled=dot(dTip_ef, A1); and
calculating a controller device translation in a second dimension as:
dy_unscaled=dot(dTip_ef, A2); such that dx_unscaled and dy_unscaled are proportional to translation of the object in the first dimension and the second dimension on a display screen wherein the controller device is operable to do the estimating and calculating based upon the initial and final orientations of the controller device in timed sequence in the magnetic field.

14. A method as in claim 13 further comprising the steps;
scaling said controller device translation in said first dimension by:
dx_final=Point_gain*dx_unscaled; and
scaling said controller device translation in said second dimension by:
dy_final=Point_gain*dy_unscaled.

15. A controller device for controlling the motion of an object on a display screen in a first and second dimension from a first position to a second position comprising:
a means to measure a magnetic field in at least two axes of the controller device in timed sequence by moving the controller device through a changing orientation in a sequence of time from an initial orientation to a final orientation; and
means for computing and processing magnetic field data such that a transformation matrix, T, at each timed sequence is computed as a product of rotations such that T=Π_i (Rp_i(ap_i)) wherein T is approximately determined as a combination of rotations about the at least two axes of the device such that the final orientation is estimated as the initial orientation of the device times the product of rotations, T, from the initial orientation to the final orientation and Rp_i(ap_i) is a rotation matrix for a rotation around axis Ui by angle ai wherein the object on a display screen moves from the first position to the second position as determined by the controller device.

16. A controller device as in claim 15 wherein said means to measure a magnetic field is one or more sensors chosen from a group comprising magnetoinductive and magnetoresistive sensors.

17. A controller device as in claim 15 further comprising;
a button such that engagement of the button enables preselected orientation data to be communicated to another device.

18. A controller device as in claim 15 further comprising at least one sensor chosen from a group comprising accelerometer, inclinometer, gyroscope, angular rate sensor, GPS, optical sensors and tactile sensors.

19. A controller device as in claim 18 wherein said means for computing and processing further comprises an algorithm wherein a state variable, attitude, is calculated with a Kalman Filter and said transformation matrix, T, at each timed sequence wherein the matrix T propagates the state variable attitude.

20. A device for sensing orientation comprising;
an angular rate sensor for measuring angular rate of rotation of the device;
a magnetic sensor sensing in at least two axes of the device; and
a means for computing transformation matrices Tomega and T in timed sequence wherein T is approximately determined as a combination of rotation matrices about the axes of the device such that the final orientation is estimated as the initial orientation of the device times the product of rotations, T, from the initial orientation to the final orientation as sensed by the magnetic sensor and Tomega is the transformation matrix that is obtained by combining at least two of the angular rate sensor rotations.

21. A device as in claim 20 wherein said device is attached to a second, larger apparatus such that the orientation and acceleration of the apparatus is measured over a period of time wherein said device begins measuring when the apparatus' acceleration exceeds a first predetermined magnitude and stops measuring when the apparatus' acceleration is below a second predetermined magnitude.

22. A system for sensing the orientation of a first device sequenced in time comprising;
   a first device comprising one angular rate sensor oriented along a first axis, a magnetic sensor oriented along a second axis and a second magnetic sensor oriented along a third axis, wherein the orientation of the first axis is not parallel to the orientation of the second or third axis and the orientation of the second axis is not parallel to the orientation of the third axis; and
   a means for computing transformation matrices Tomega and T; such that Tomega, T, and a state variable, attitude, are computed in timed sequence wherein T is approximately determined as a combination of rotations about the axes of the first device such that the final orientation is estimated as the initial orientation of the first device times the product of rotations, T, from the initial orientation to the final orientation and Tomega is the transformation that is obtained by combining at least two of the angular rate sensor rotations; and wherein angular rate of rotation of the first device is continuously sensed and a magnetic field is continuously sensed by moving the first device through a changing orientation in a sequence of time from an initial orientation to a final orientation.

23. The system of claim 22 comprising a second device wherein said means for computing resides.

24. A system for sensing the orientation of a first device sequenced in time comprising:
   a first device comprising at least one angular inertial sensor oriented to measure rotational information about a first axis and at least first and second magnetic sensors oriented along a second and third axis, wherein the second and third axes are non-co-linear to each other such that the second and third axes form the base of a plane orthogonal to the first axis and wherein rotational position of the first device is continuously sensed and a magnetic field is continuously sensed by moving the first device through a changing orientation in a sequence of time from an initial orientation to a final orientation; and
   a means for computing transformation matrices Tomega and T; such that Tomega, T, and a state variable, attitude, are computed in timed sequence wherein T is approximately determined as a combination of rotations about the axes of the first device such that the final orientation is estimated as the initial orientation of the first device times the product of rotations, T, from the initial orientation to the final orientation and Tomega is the transformation that is obtained by combining at least two of the at least one angular inertial sensor measurements.

25. The system of claim 24 further comprising a second device wherein said means for computing resides.

* * * * *